United States Patent
Lavoie et al.

(10) Patent No.: US 8,079,039 B2
(45) Date of Patent: Dec. 13, 2011

(54) ISOLATING, MANAGING AND COMMUNICATING WITH USER INTERFACE ELEMENTS

(75) Inventors: Lauren Lavoie, Seattle, WA (US); David P. Relyea, Bellevue, WA (US); Ashish S. Shetty, Bothell, WA (US); WeiBing Zhan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1126 days.

(21) Appl. No.: 11/716,328

(22) Filed: Mar. 9, 2007

(65) Prior Publication Data

US 2008/0222622 A1 Sep. 11, 2008

(51) Int. Cl.
*G06F 3/038* (2006.01)
(52) U.S. Cl. ........ 719/315; 719/329; 715/762; 715/781; 715/803; 715/804
(58) Field of Classification Search .................. None
See application file for complete search history.

(56) References Cited

U.S. PATENT DOCUMENTS

| | | | |
|---|---|---|---|
| 6,161,148 A | 12/2000 | Pratt et al. | |
| 6,229,537 B1* | 5/2001 | Sobeski et al. | 715/803 |
| 6,453,460 B1 | 9/2002 | Keyes | |
| 6,469,714 B2 | 10/2002 | Buxton et al. | |
| 6,522,343 B2 | 2/2003 | Sobeski et al. | |
| 6,545,691 B1 | 4/2003 | Vallejo | |
| 6,675,230 B1 | 1/2004 | Lewallen | |
| 6,675,371 B1* | 1/2004 | York et al. | 717/114 |
| 7,086,006 B2 | 8/2006 | Subramanian et al. | |
| 7,145,898 B1 | 12/2006 | Elliott | |
| 2002/0112090 A1* | 8/2002 | Bennett et al. | 709/319 |
| 2002/0174432 A1 | 11/2002 | Schiller | |
| 2003/0110503 A1 | 6/2003 | Perkes | |
| 2004/0237071 A1 | 11/2004 | Hollander et al. | |
| 2005/0091603 A1 | 4/2005 | Chen et al. | |
| 2005/0108104 A1 | 5/2005 | Woo | |
| 2005/0149726 A1 | 7/2005 | Joshi et al. | |
| 2005/0218739 A1* | 10/2005 | Maddin et al. | 310/120 |
| 2005/0273782 A1 | 12/2005 | Shpeisman et al. | |

(Continued)

FOREIGN PATENT DOCUMENTS

CN 101627380 A 1/2010

(Continued)

OTHER PUBLICATIONS

"Refresh Software Introduces the Newest Leading Component Content Management System (CMS) SR2 v7.0", Date: Sep. 21, 2006, http://www.refreshsoftware.com/pr_SR2_7.

(Continued)

*Primary Examiner* — Sam Sough
*Assistant Examiner* — Syed Roni

(57) ABSTRACT

Various technologies and techniques are disclosed that allow a user interface in a managed runtime environment to display content from two or more different partitioned process spaces. A software application having a user interface operates a managed runtime environment. A window handle allows a user interface of the application to display content from different partitioned process spaces at a same time. Information from the partitioned process spaces can be integrated within the user interface while preserving a level of isolation between the partitioned process spaces. This is accomplished by providing a first portion of a content container for the user interface with a host control that contains the window handle and resides in a first partitioned process space of a main window. A second portion of the content container is provided with a source control that provides the window handle and resides in a second partitioned process space.

16 Claims, 7 Drawing Sheets

U.S. PATENT DOCUMENTS

2006/0010134 A1* 1/2006 Davis et al. .................... 707/10
2006/0041877 A1 2/2006 Harsh et al.

FOREIGN PATENT DOCUMENTS

| EP | 2135173 A | 12/2009 |
| JP | 2010521033 | 6/2010 |
| WO | 2008/109480 A2 | 9/2008 |
| WO | 2008112385 | 9/2008 |

OTHER PUBLICATIONS

"User Interface Corner", http://ui.netbeans.org/index.html, Nov. 22, 2005.

Barmsnes, et al., "Picasso: A User Interface Management System for Real-Time Applications", Date: Mar. 11-12, 1992, http://www2.hrp.no/procsee/papers/bcs92.pdf.

International Search Report and Written Opinion Received for PCT Application No. PCT/US2008/054153, mailed on Jul. 14, 2008, 10 pages.

Supplementary European Search Report Received for EP Patent Application No. 08743485.8, mailed on Jul. 6, 2010, 8 pages.

Feske, Norman et al. "A Nitpickers guide to a minimal-complexity secure GUI", The Computer Society, 21st Annual Computer Security Applications Conference, ISBN: 978-0-7695-2461-0, Dec. 5, 2005, pp. 85-94.

International Preliminary Report on Patentability for application No. PCT/US2008/054153 dated Sep. 24, 2009, 8 pages.

* cited by examiner

ISOLATING, MANAGING AND COMMUNICATING WITH USER INTERFACE ELEMENTS

BACKGROUND

In modern software development, many applications are written to execute within a managed runtime environment, such as the MICROSOFT® .NET Framework. Managed runtime environments serve as a way to allow applications access to system resources, enforce security policies, etc. A managed runtime environment accomplishes this by creating "partitioned process spaces" wherein an application is executed. A partitioned process space allows an application to execute in such a manner that it is isolated from any other partitioned spaces in the process that the computer may be executing at the time. In the MICROSOFT® .NET Framework, these partitioned process spaces are called "AppDomains".

A problem arises when an application is executed in one partitioned process space and the content is required to execute in another partitioned process space. Given the isolation and other rules governing managed runtime environments discussed earlier, the application will not be able to communicate with the content in the different partitioned process space, nor will the content be shown as part of the application.

SUMMARY

Various technologies and techniques are disclosed that allow a user interface in a managed runtime environment to display content from two or more different partitioned process spaces. A particular software application is provided that operates in a managed runtime environment, the particular software application having a user interface. A window handle is used to allow a user interface of the particular software application to display content from two or more different partitioned process spaces at a same time. Information from the two or more partitioned process spaces can be integrated within the user interface of the software application while preserving a level of isolation between the two or more different partitioned process spaces. This is accomplished by providing a first portion of a content container for the user interface with a host control that will contain a provided window as a child window and resides in a first partitioned process space of a main window. A second portion of the content container for the user interface is provided with a source control that provides the window handle and resides in a second partitioned process space of the main window. In one implementation, the second portion of the content container can have content for display, such as in an isolated frame control.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
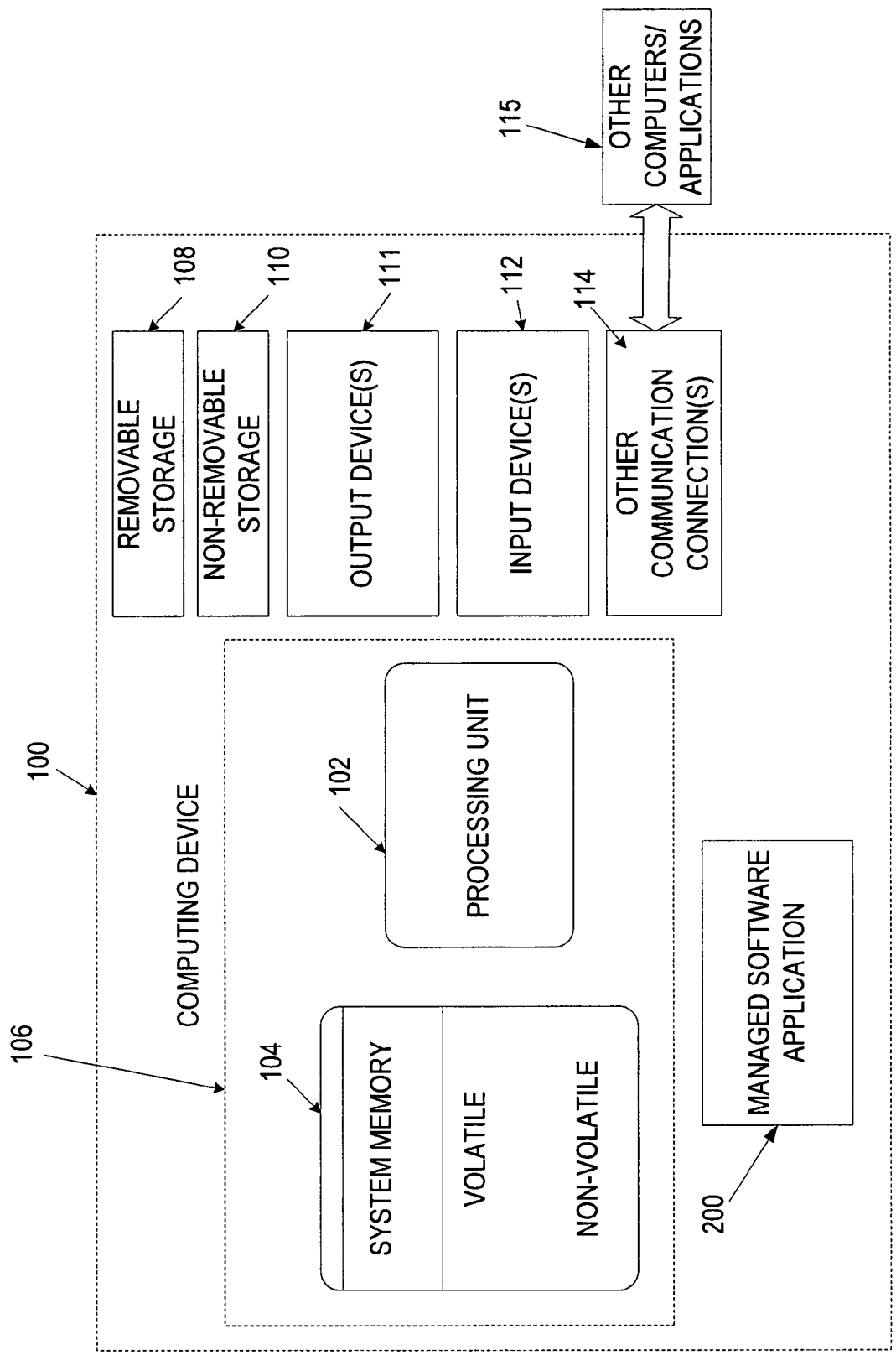
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that allows content from different partitioned process spaces to be displayed in the same user interface in a managed environment, but the system also serves other purposes in addition to these. In one implementation, one or more of the techniques described herein can be implemented as features within a framework environment such as MICROSOFT® .NET Framework, or from any other type of program or service that allows for execution and/or development of software.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes managed software application 200. Managed software application 200 will be described in further detail in FIG. 2.

Figure 2:
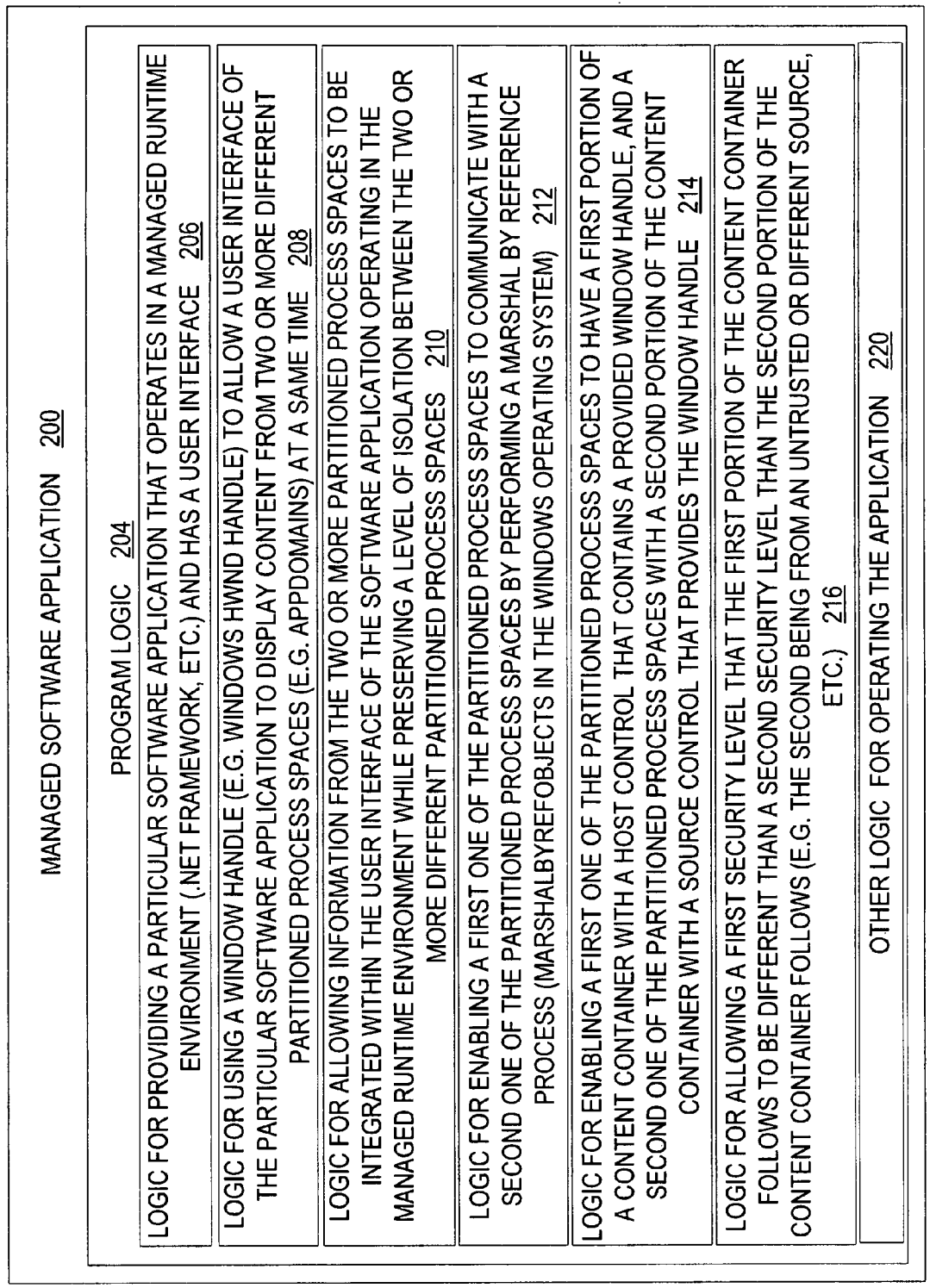
FIG. 2 is a diagrammatic view of a managed software application of one implementation operating on the computer system of FIG. 1.

Turning now to FIG. 2 with continued reference to FIG. 1, a managed software application 200 operating on computing device 100 is illustrated. Managed software application 200 is one of the application programs that reside on computing device 100. However, it will be understood that managed software application 200 can alternatively or additionally be embodied as computer-executable instructions on one or more computers and/or in different variations than shown on FIG. 1. Alternatively or additionally, one or more parts of managed software application 200 can be part of system memory 104, on other computers and/or applications 115, or other such variations as would occur to one in the computer software art.

Managed software application 200 includes program logic 204, which is responsible for carrying out some or all of the techniques described herein. Program logic 204 includes logic for providing a particular software application that operates in a managed runtime environment (.NET Framework, etc.) and has a user interface 206; logic for using a window handle (e.g. MICROSOFT® Windows HWND handle) to allow a user interface of the particular software application to display content from two or more different partitioned process spaces (e.g. AppDomains) at a same time 208; logic for allowing information from the two or more partitioned process spaces to be integrated within the user interface of the software application operating in the managed runtime environment while preserving a level of isolation between the two or more different partitioned process spaces 210; logic for enabling a first one of the partitioned process spaces to communicate with a second one of the partitioned process spaces by performing a marshal by reference process (MarshalByRefObjects in the windows operating system) 212; logic for enabling a first one of the partitioned process spaces to have a first portion of content container with a host control that contains a provided window handle, and a second one of the partitioned process spaces with a second portion of the content container with a source control that provides the window handle 214; logic for allowing a first security level that the first portion of the content container follows to be different than a second security level than the second portion of the content container follows (e.g. the second being from an entrusted or different source, etc.) 216; and other logic for operating the application 220. In one implementation, program logic 204 is operable to be called programmatically from another program, such as using a single call to a procedure in program logic 204.

Figure 3:
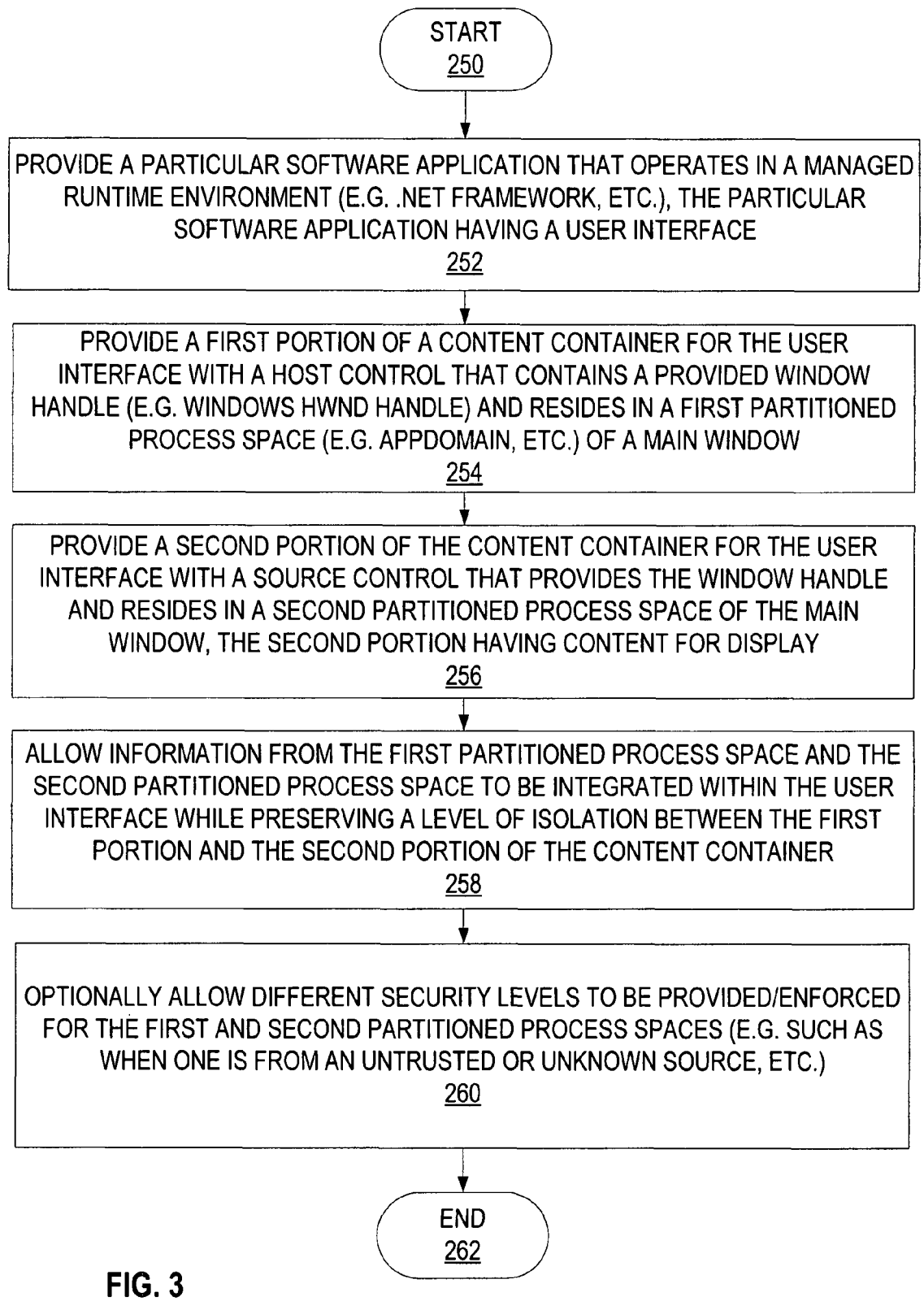
FIG. 3 is a process flow diagram illustrating the high level stages involved in one implementation of the system of FIG. 1.
Figure 4:
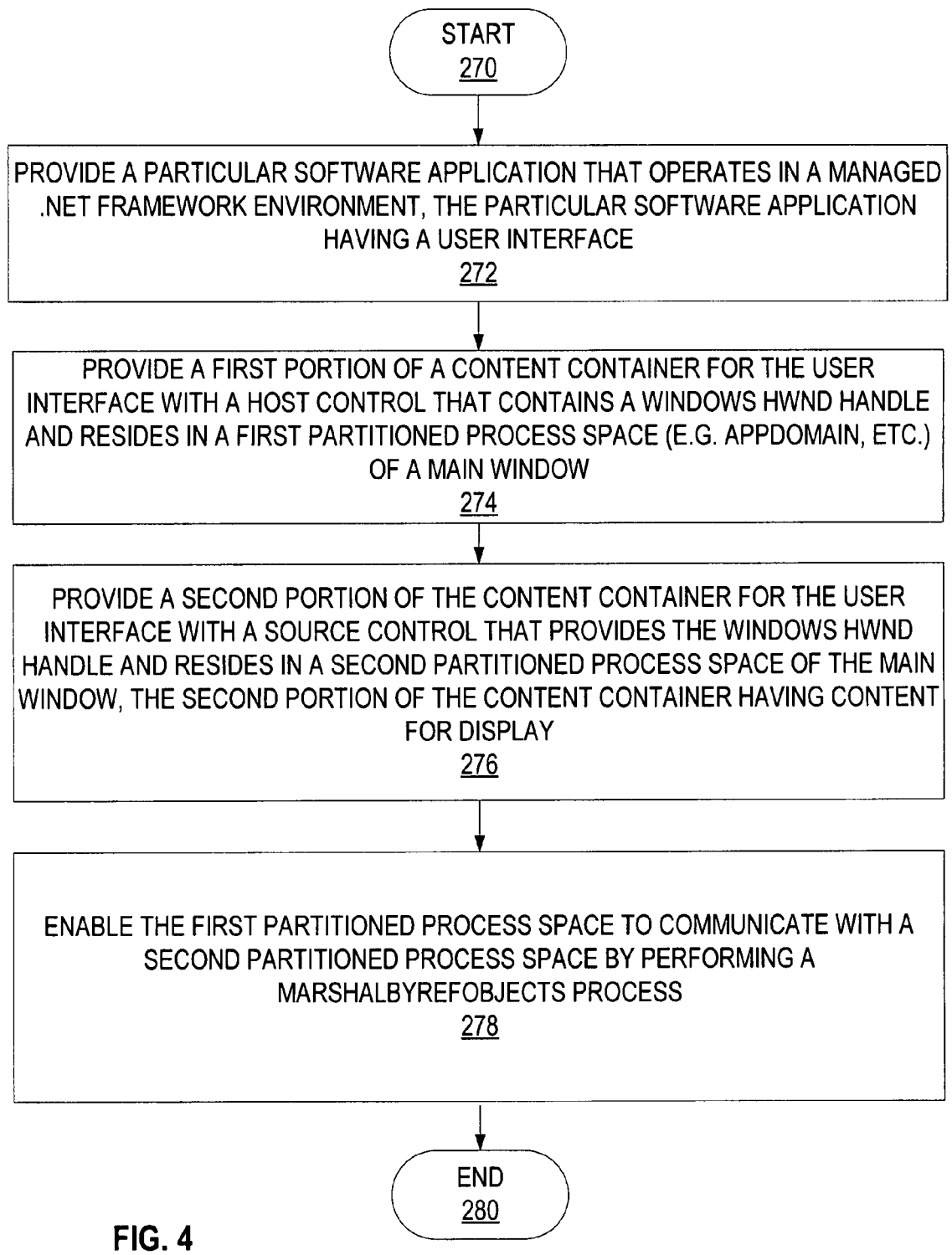
FIG. 4 is a process flow diagram for one implementation of the system of FIG. 1 illustrating the stages involved in allowing content from different partitioned process spaces to be displayed together and to communicate with each other.
Figure 5:
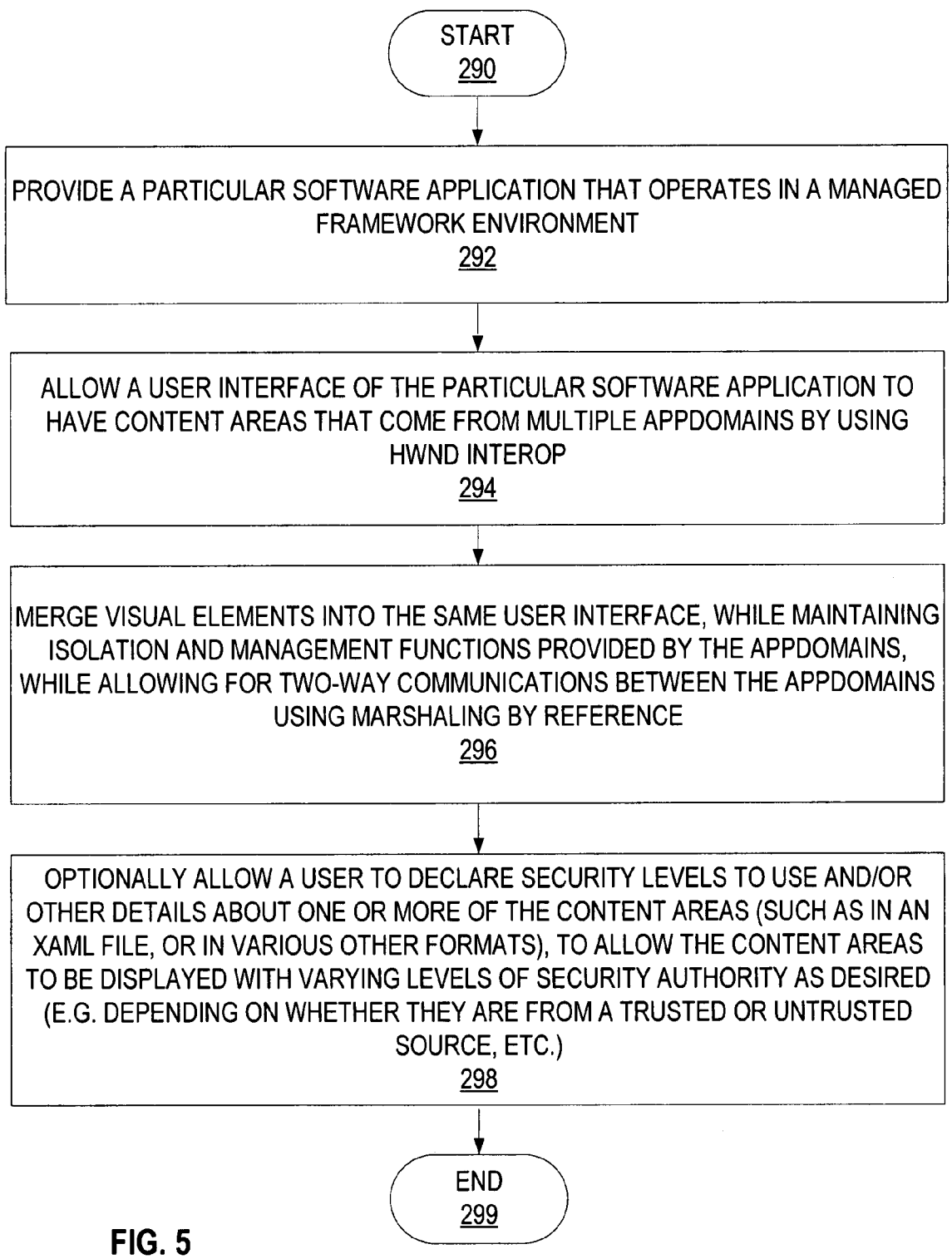
FIG. 5 is a process flow diagram for one implementation of the high level stages of the system of FIG. 1 illustrating the stages involved in allowing content from different partitioned process spaces to be displayed together with different levels of security.

Turning now to FIGS. 3-5 with continued reference to FIGS. 1-2, the stages for implementing one or more implementations of managed software application 200 are described in further detail. FIG. 3 is a process flow diagram illustrating the high level stages involved in one implementation of the system of FIG. 1. In one form, the process of FIG. 3 is at least partially implemented in the operating logic of computing device 100. The process begins at start point 250 with providing a particular software application that operates in a managed runtime environment (e.g., .NET Framework, etc.), the particular software application having a user interface (stage 252). A first portion of a content container for the user interface has a host control that contains a provided window handle (e.g. MICROSOFT® Windows HWND handle) and resides in a first partitioned process space (e.g. AppDomain, etc.) of a main window (stage 254). A second portion of the content container for the user interface is provided with a source control that provides the window handle and resides in a second partitioned process space of the main window, the second portion having content for display (stage 256). Information from the first partitioned process space and the second partitioned process space can be integrated within the user interface while preserving a level of isolation between the first portion and the second portion of the content container (stage 258). Different security levels can optionally be provided/enforced for the first and second partitioned process spaces (e.g. such as when one is from an untrusted or unknown source, etc.) (stage 260). The process ends at end point 262.

FIG. 4 is a process flow diagram for one implementation of the system of FIG. 1 illustrating the stages involved in allowing content from different partitioned process spaces to be displayed together and to communicate with each other. In one form, the process of FIG. 4 is at least partially implemented in the operating logic of computing device 100. The process begins at start point 270 with providing a particular software application that operates in a managed .NET framework environment, the particular software application having a user interface (stage 272). A first portion of a content container is provided for the user interface with a host control that contains a MICROSOFT® Windows HWND handle and resides in a first partitioned process space (e.g. AppDomain, etc.) for a main window (stage 274). A second portion of the content container is provided for the user interface with a source control that provides the MICROSOFT® Windows HWND handle and resides in a second partitioned process space of the main window (stage 276). In one implementation, the second portion of the content container has content for display, such as in an isolated frame control (stage 276). The first partitioned process space can communicate with a second partitioned process space by performing a MarshalByRefObjects process (stage 278). The process ends at end point 280.

FIG. 5 is a process flow diagram for one implementation of the high level stages of the system of FIG. 1 illustrating the stages involved in allowing content from different partitioned process spaces to be displayed together with different levels of security. In one form, the process of FIG. 5 is at least partially implemented in the operating logic of computing device 100. The process begins at start point 290 with providing a particular software application that operates in a managed framework environment (stage 292). A user interface of the particular software application can have content areas that come from multiple AppDomains by using MICROSOFT® Windows HWND interop (stage 294). Visual elements can be merged into the same user interface, while maintaining isolation and management functions provided by the AppDomains, while allowing for two-way communications between the AppDomains using marshaling by reference (stage 296). Optionally, a user, such as the software developer, can declare security levels to use and/or other details about one or more of the content areas (such as in an XAML file, or in various other formats) (stage 298). This allows the content areas to be displayed with varying levels of security authority as desired (stage 298). For example, it may be desirable to vary the security levels depending on whether the content is from a trusted or untrusted source, etc. (stage 298). The process ends at end point 299.

Figure 6:
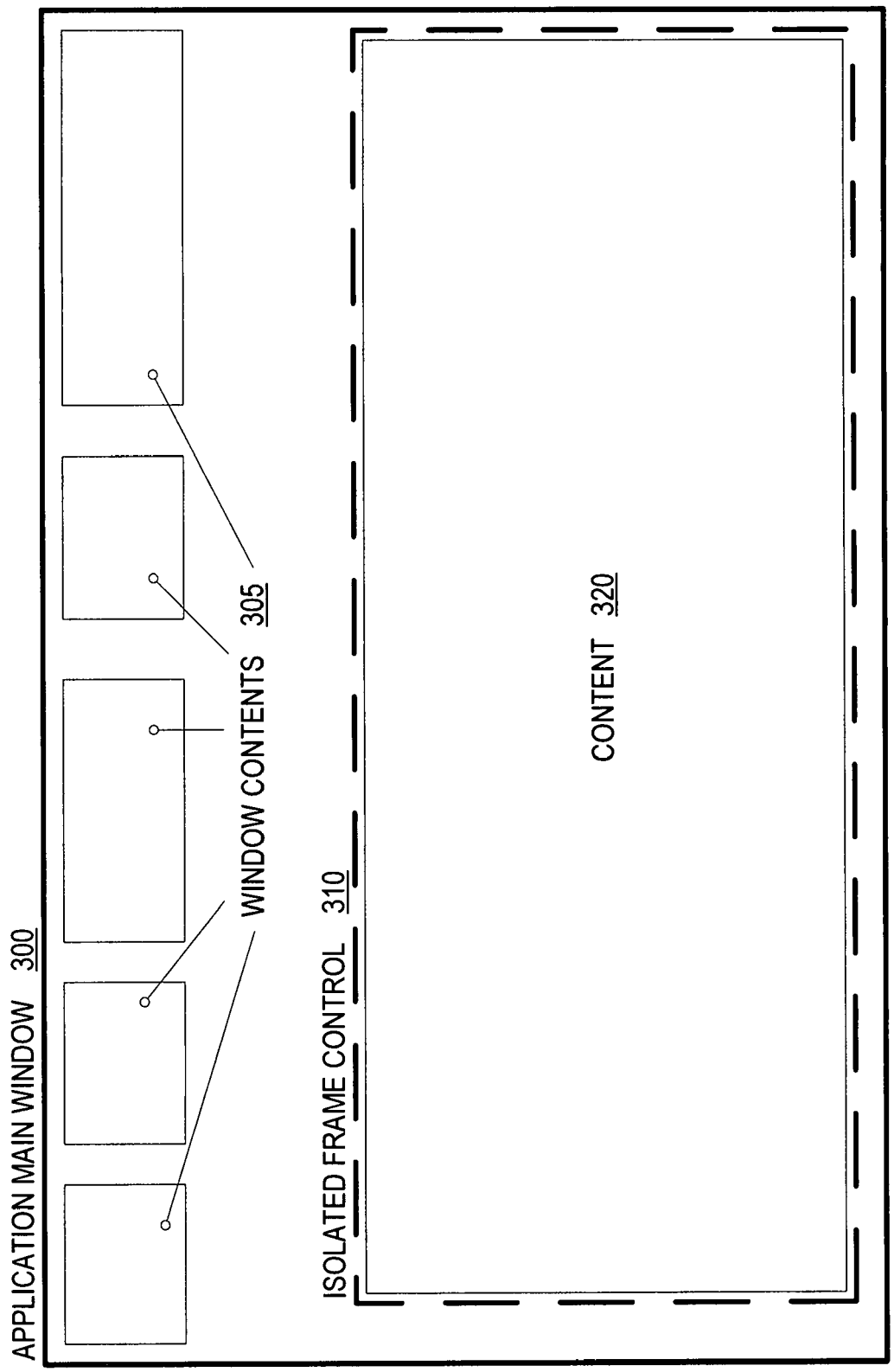
FIG. 6 illustrates a logical diagram of one implementation showing external content appearing within an isolated frame control.

FIG. 6 is a logical diagram for one implementation that illustrates external content appearing within an isolated frame control. Application main window 300 is some graphical application that contains window contents 305. Window contents 305 can be any kind of visual element that is displayed to the user. Application main window 300 also contains isolated frame control 310. Isolated frame control 310 will contain content 320 where content 320 is external to the overall application. Isolated frame control 310 may be invisible to the user. In one implementation, some or all of the techniques discussed herein are used to allow content 320 (such as from a separate entity that is untrusted) to be displayed in an isolated frame control that operates in a different partitioned space than the window contents 305.

Figure 7:
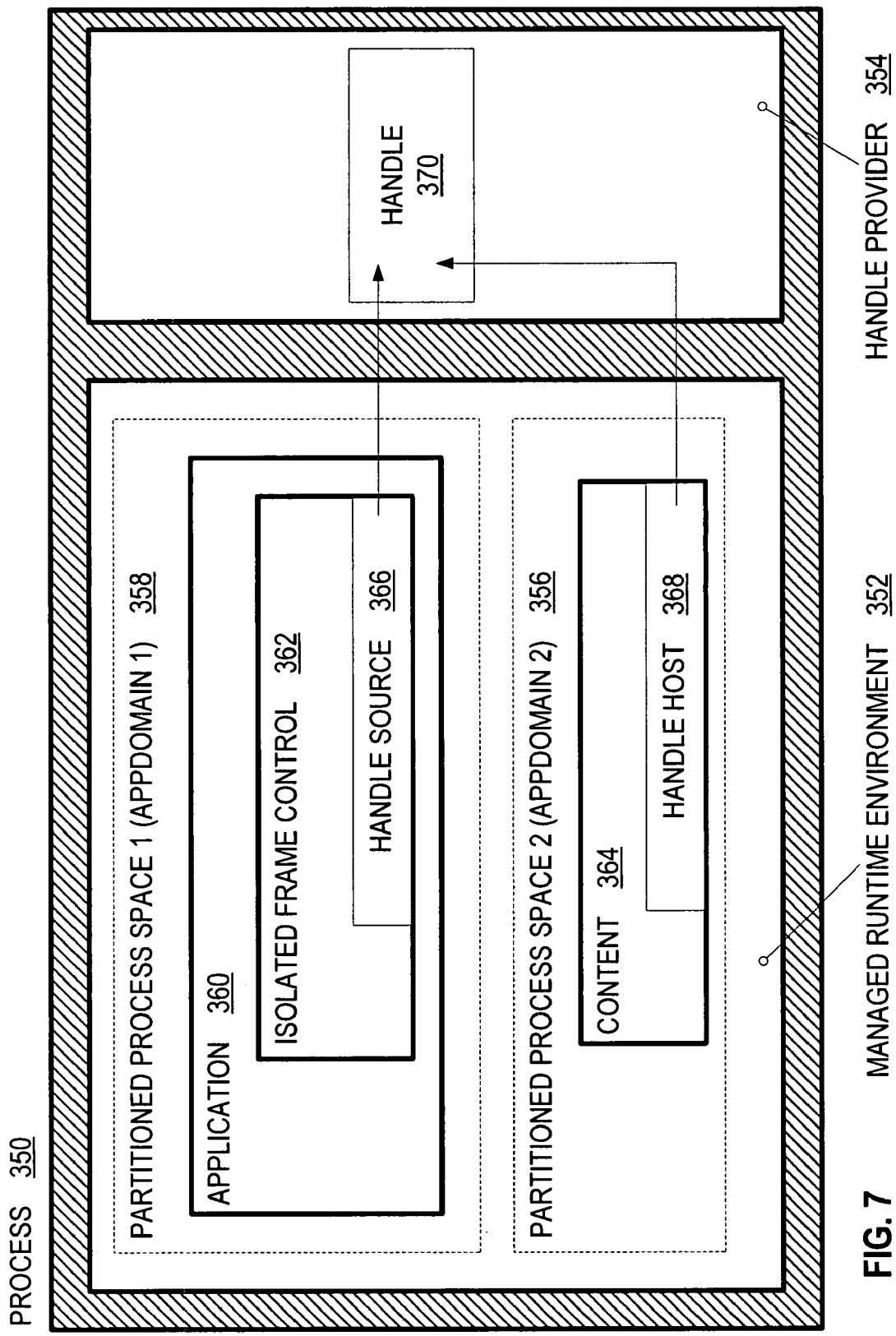
FIG. 7 is a logical diagram for one implementation illustrates using a window handle to allow content from different partitioned process spaces to be displayed in the same user interface.

FIG. 7 is a logical diagram for one implementation illustrates using a window handle to allow content from different partitioned process spaces to be displayed in the same user interface. Process 350 will create a first partitioned process space 358 within a managed runtime environment 352. Within the partitioned process space 358, an application 360 is executed. The application 360 contains an isolated frame control 362 wherein there is a handle source 366. The isolated frame control will be loading content 364 so that it is visible to a user. Content 364 is external to application 360 and, as such, will require the process 350 to create a second partitioned process space 356 wherein the content 364 shall be executed. When the content 364 is loaded, one of its components, a handle host 368 registers itself with a handle provider 354 as a window handle 370. The handle source 366 can then access the window handle 370 and show the content 364 within the isolated frame control 362 contained within the application 360.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer storage medium having computer-executable instructions for causing a computer to perform steps comprising:

provide a particular software application that operates in a managed runtime environment, the particular software application having a user interface;

use a window handle to allow a user interface of the particular software application to display content from two or more different partitioned process spaces at a same time; and allow information from the two or more partitioned process spaces to be integrated within the user interface of the software application operating in the managed runtime environment while preserving isolation between the two or more different partitioned process spaces;

the first one of the partitioned process spaces having a first portion of a content container for the user interface with a host control that contains a provided window as a child window; and the second one of the partitioned process spaces having a second portion of the content container for the user interface with a source control that provides the window handle.

2. The computer storage medium of claim 1, wherein the managed runtime environment is a managed software framework environment.

3. The computer storage medium of claim 1, wherein the two or more partitioned process spaces are AppDomains in the managed runtime environment.

4. The computer storage medium of claim 1, wherein a first one of the partitioned process spaces is operable to communicate with a second one of the partitioned process spaces by performing a marshal by reference process.

5. The computer storage medium of claim 4, wherein the marshal by reference process uses a MarshalByRefObjects process in a Windows operating system.

6. The computer storage medium of claim 1, wherein a first security level that the first portion of the content container follows is different than a second security level that the second portion of the content container follows.

7. The computer storage medium of claim 6, wherein the second portion of the content container displays content from an untrusted source.

8. A method for integrating user interface content from different partitioned process spaces in a single user interface comprising the steps of:

providing a particular software application that operates in a managed runtime environment, the particular software application having a user interface;

providing a first portion of a content container for the user interface with a host control that contains a provided window as a child window and resides in a first partitioned process space of a main window;

providing a second portion of the content container for the user interface with a source control that provides a window handle and resides in a second partitioned process space of the main window, the second portion of the content container having content for display; and allowing information from the first partitioned process space and the second partitioned process space to be integrated within the user interface of the software application operating in the managed runtime environment while preserving isolation between the first portion and the second portion of the content container.

9. The method of claim 8, wherein the managed runtime environment is a managed software framework environment.

10. The method of claim 8, wherein the first partitioned process space and the second partitioned process space are AppDomains in the managed runtime environment.

11. The method of claim 8, wherein a first security level that the first portion of the content container follows is different than a second security level that the second portion of the content container follows.

12. A computer storage medium having computer-executable instructions for causing a computer to perform the steps recited in claim 8.

13. A method for integrating user interface content from different partitioned process spaces in a single user interface comprising the steps of:

providing a particular software application that operates in a managed software framework environment, the particular software application having a user interface;

providing a first portion of a content container for the user interface with a host control that contains a provided window as a child window and resides in a first partitioned process space of a main window;

providing a second portion of the content container for the user interface with a source control that provides a window handle and resides in a second partitioned process space of the main window, the second portion of the content container having content for display; and allowing information from more than one partitioned process space to be integrated within the user interface of the software application operating in the managed software framework environment while preserving isolation between the first portion and the second portion by using the provided window from the first portion of the content container and the window handle from the second portion of the content container.

14. The method of claim 13, wherein the first partitioned process space and the second partitioned process space are AppDomains in the managed software framework environment.

15. The method of claim 13, wherein the first partitioned process space is operable to communicate with a second partitioned process space by performing a MarshalByRefObjects process.

16. A computer storage medium having computer-executable instructions for causing a computer to perform the steps recited in claim 13.

* * * * *

UNITED STATES PATENT AND TRADEMARK OFFICE
CERTIFICATE OF CORRECTION

PATENT NO. : 8,079,039 B2  Page 1 of 1
APPLICATION NO. : 11/716328
DATED : December 13, 2011
INVENTOR(S) : Lauren Lavoie et al.

It is certified that error appears in the above-identified patent and that said Letters Patent is hereby corrected as shown below:

On the title page, in item (57), under "Abstract" column 2, line 5, before "a" insert -- in --.

Signed and Sealed this
Third Day of April, 2012

David J. Kappos
*Director of the United States Patent and Trademark Office*